United States Patent
Cheng et al.

(10) Patent No.: US 7,327,906 B2
(45) Date of Patent: Feb. 5, 2008

(54) METHOD AND DEVICE FOR DRAWING AND FORMATTING IMAGE

(75) Inventors: Stone Cheng, Kaohsiung (TW);
Shih-Wen Chen, Taichung (TW)

(73) Assignee: Transpacific IP Ltd., Taipei (TW)

( * ) Notice: Subject to any disclaimer, the term of this patent is extended or adjusted under 35 U.S.C. 154(b) by 761 days.

(21) Appl. No.: 10/251,214

(22) Filed: Sep. 20, 2002

(65) Prior Publication Data

US 2004/0057635 A1    Mar. 25, 2004

(51) Int. Cl.
*G06K 9/20*        (2006.01)
(52) U.S. Cl. ........................................ 382/321; 382/318
(58) Field of Classification Search ................. 382/173, 382/178, 312, 321, 318, 319; 358/1.9
See application file for complete search history.

(56) References Cited

U.S. PATENT DOCUMENTS 6,542,173 B1 *    4/2003  Buckley ...................... 358/1.9

* cited by examiner

*Primary Examiner*—Duy M. Dang
(74) *Attorney, Agent, or Firm*—Stolowitz Ford Cowger LLP

(57) ABSTRACT

Methods and apparatuses for drawing and formatting an image are described. In at least one embodiment, when a user prepares to use an application, or a file, to treat the scanned image of an object, the user only needs to place the object on a scanner and to select the icon of the application, or the file, and compile it with the icon of the scanner. The utilization of several embodiments of the present invention will automatically drive the driver of the scanner and integrate the relative information into the driver. Thus, after the scanned image is acquired, the application is activated to treat the scanned image. Further, the format of the scanned image could be transformed by some applications such as the OCR.

43 Claims, 5 Drawing Sheets

Monitor whether a scanning icon is overlapped with a non-scanning icon on a display device. — 21

Analyze a content of the non-scanning icon while the non-scanning icon is overlapped with the scanning icon. — 22

Control the scanning device to perform the corresponding scanning action in according to the content. — 23

Perform the corresponding specific action after the scanning action is finished. — 24

METHOD AND DEVICE FOR DRAWING AND FORMATTING IMAGE

BACKGROUND OF THE INVENTION

1. Field of the Invention

The present invention generally relates to a method for drawing and formatting an image, and more particularly to a method and device to treat a scanned image by using a program or a file by selecting a scanner icon and a program icon (or a file icon).

2. Description of the Prior Art

In the conventional technologies, there are two common methods for a user to use a program and/or a file to treat an image acquired from scanning an object:

The first method, as shown by activating scanner block 11, setting up scanning block 12 and activating program block 13 of FIG. 1A. The user needs to sequentially activate (call) the driver (such as VistaSCan), set up the path to operate the scanner with corresponding programs and/or files, and treat the scanned image by the activated program and/or file after the operation of the scanner is finished.

The second method, as shown by activating block 14, driving block 15 and treating block 16 of FIG. 1B. The user needs to sequentially activate a program and/or a file which supports the TWAIN interface, use the program (file) to drive the scanner, and use the program (file) to treat the scanned image acquired by scanning.

Indisputably, both methods have unavoidable defects. For the first method the operating steps are complicated, and the user must perform all the steps for setting up scanning block 12. For the second method although it is not necessary to set up the program and file path before scanning, not every program and file supports the TWAIN interface.

Therefore, it's a desired objective to enhance the users scanning convenience, by providing the freedom to use a current scanning process without supporting the TWAIN interface.

SUMMARY OF THE INVENTION

An object of the present invention is to simplify the scanning process, scanned image especially to eliminate the load the user performs to certify the path of programs and files prior to scanning the image.

Another object of the present invention Is to easily acquire a scanned image even if the TWAIN interface is supported or not.

A main characteristic of the present invention is similar to the function in the current operations system, which two different programs (or files) could interact with each other while their corresponding icons are overlapped. For example, in the current operation of the windows system, if a file icon is drawn into the "recycle bin" icon, the icon , functions, file and recycle, are then combined to delete the file. In comparison, in the present invention, the user only needs to select and draw a non-scanned icon that corresponds to a file or a program, into a scanned icon that corresponds to a scanner. The functions of both the non-scanned icon and the scanned icon are automatically activated to scan the image.

Another main characteristic of the present invention is described as follows. While a non-scanned icon is overlapped with a scanned icon, the contents of both icons are first analyzed for scanning, the driver is then activated and the program (file) information, such as path, are automatically integrated into the driver. Hence, after an image is acquired by a scanning operation, the image could be treated by an automatically activated program (or corresponding program of the file). Further, some programs, such as the optical character recognition program (OCR program), could be used to transfer the image into a format that is acceptable for the activated program.

Clearly, this invention allows the user to scan without setting up a path, and allows the user to scan without considering whether the TWAIN interface is supported. While a scanning operation is required, one only needs to put the object on the scanner, to decide whether the program (or file) would be used to treat the scanned image, and to draw the icon(s).

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
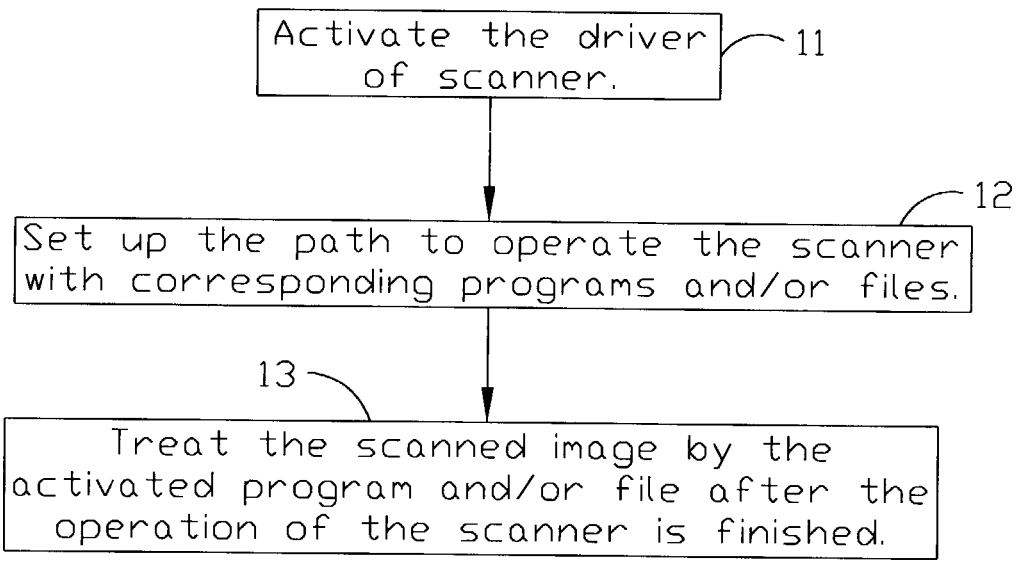
FIG. 1A and FIG. 1B are two flow-charts that show the conventional steps performed by a user while a program (or a file) would be used to treat a scanned file.
Figure 1B:
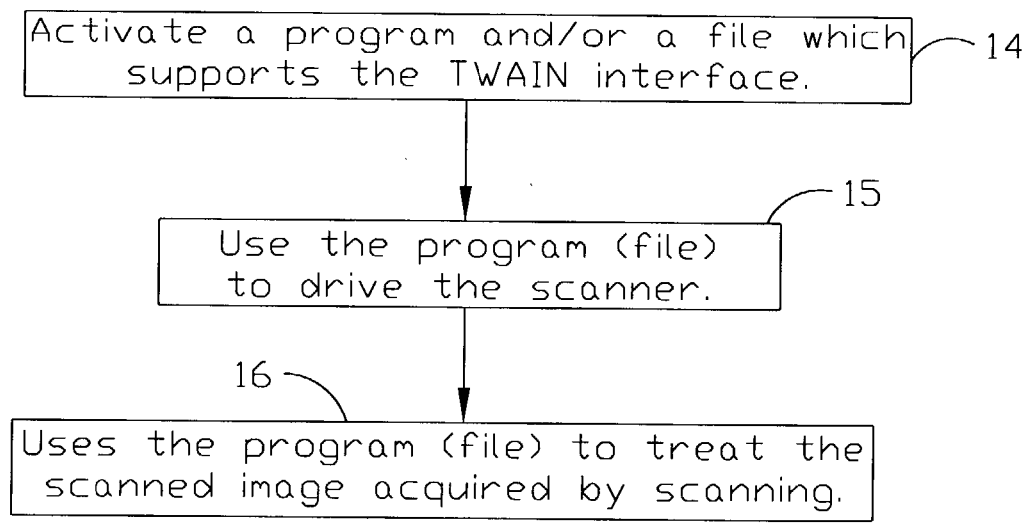
Figure 2A:
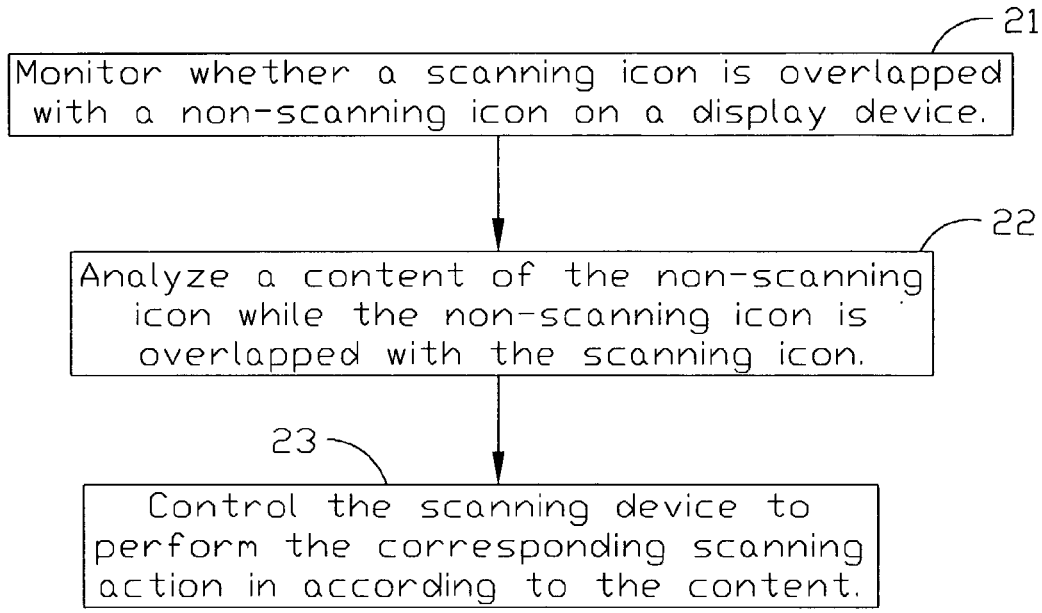
FIG. 2A to FIG. 2C shows three possible flow-charts of one preferred embodiment of the present invention.

According to the previous discussions, one preferred embodiment of the invention is a method for drawing and formatting images as shown in FIG. 2A, and at least comprises the following steps:

As shown in monitoring block 21, a monitoring process is performed to monitor whether a scanned icon is overlapped with a non-scanned icon on a display device.

As shown in analyzing block 22, an analyzing process is performed to analyze the content of the non-scanned icon while the non-scanned icon is overlapped with the scanned icon.

As shown in controlling block 23, a controlling process is performed to control the scanning device to perform the corresponding scanning action according to the content.

Figure 2B:
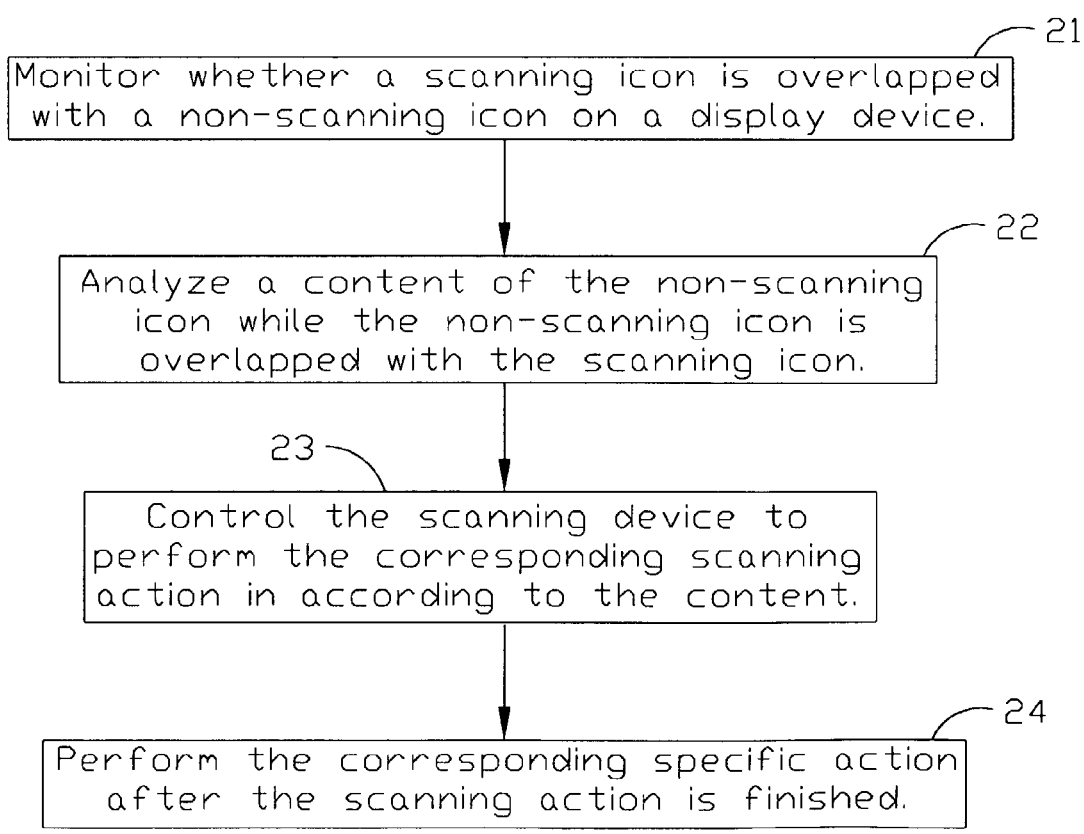

Certainly, as shown in FIG. 2B, the preferred embodiment could perform a processing block 24 and the corresponding specific action after the scanning action and the performing block 23 is finished. For example, if the corresponding file to the non-scanned icon is a TEXT file that is unable to treat an image, the corresponding specific action could use an optical character recognition process to treat an image acquired by the scanning action.

In the embodiment, the analyzing process decides which specific program or a specific file corresponds with the non-scanned icon. Herein, the decision could be achieved by simply referring to the files of these icons in the corresponding operating system.

Besides, the analyzing process could decide whether the specific file is distinguishable and what is the corresponding program of the specific file. For example, by referring to the files of these icons in the operating system, it is possible to handle both the name and the path of the corresponding program, and its also possible to activate the specific program for checking whether the specific program is performable.

Further, the controlling process could set up the path of the specific program while the scanning device is activated, according to the corresponding file of the non-scanned icon in the operating system. Thus, the specific program could automatically treat an image acquired by the scanning action after the scanning action is finished. Similarly, the controlling process could set up a path for the corresponding program of the distinguishable file while the scanning device is activated. Hence, the corresponding program could automatically treat an image acquired by the scanning action after the scanning action is finished.

Furthermore, while the non-scanner icon corresponds to a non-distinguishable specific file, the controlling process could send a warning message without activating the scanning device. Similarly, while the specific program is non-available, the controlling process could send a warning message without activating the scanning device.

Figure 2C:
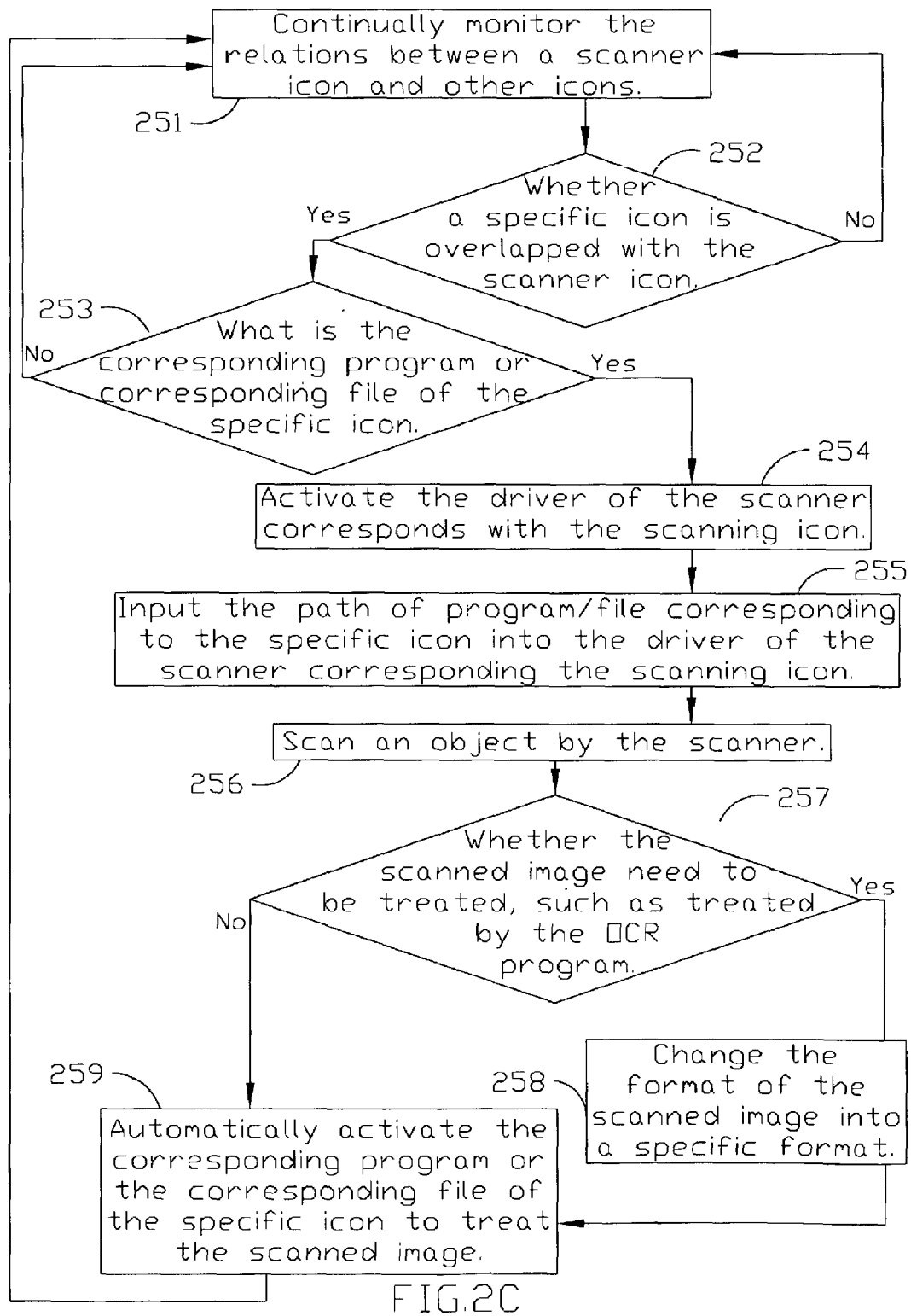

To further explain the possible amendments of the embodiment, FIG. 2C shows a possible amendment of the embodiment:

As shown in tracking block 251, a continuous monitoring between the relations of the scanner icon and other icons is performed.

As shown in the first decision block 252, it's determined whether a specific icon is overlapped with the scanner icon. If the answer is yes, the second decision block 253 is performed. Otherwise, tracking block 251 will continually perform.

As shown in the second decision block 253, it's determined which is the corresponding program or corresponding file for the specific icon. If it can not be determined or it's not distinguishable, the tracking block 251 will continually perform and send a warning message, if necessary. Otherwise, the activating block 254 is performed.

As shown in activating block 254, the active driver of the scanner corresponds with the scanned icon.

As shown in integrating block 255, the path for the program/file corresponding to the specific icon is input into the driver of the scanner corresponding to the scanned icon.

As shown in scanning block 256, scan an object by the scanner.

As shown in third deciding block 257, a determination is made whether the scanned image needs to be treated, such as the OCR program. Herein, information, such as the path of corresponding program/file, of the specific icon is used to decide whether the corresponding program/file could directly treat the scanned image or the format of the scanned image needs to be changed.

As shown in the extra processing block 258, the format of the scanned image is changed into a specific format while the answer of third deciding block 327 is necessary.

As shown in the automatically activating block 259, after both the third deciding block 257 and extra processing block 258 are finished, the specific icon of the corresponding program/file is automatically activated to treat the scanned image, and the format of the scanned image may be possibly changed.

Certainly, after the automatically activating block 259 is finished, the tracking block 251 is automatically performed again except if the user sends a new order.

Figure 3A:
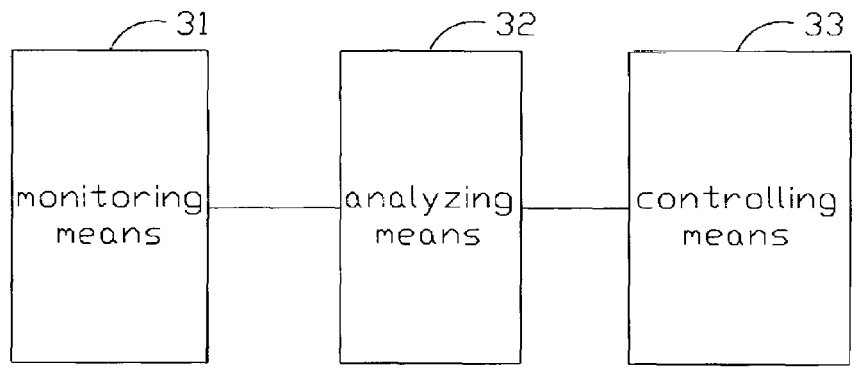
FIG. 3A and FIG. 3B shows the essential configuration of another preferred embodiment of the present invention.
Figure 3B:
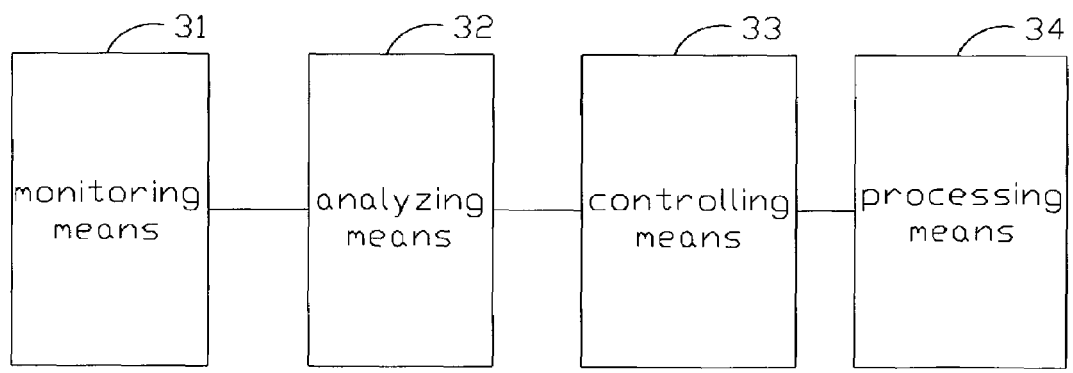

Another preferred embodiment of the invention is a device for drawing and formatting an image. As shown in FIG. 3A and FIG. 3B, at least a monitoring means 31, analyzing means 32 and a controlling means 33 is provided, and could further include a processing means 34.

Monitoring means 31 is used to monitor whether a scanned icon is overlapped with a non-scanned icon on a display device. Analyzing means 32 is used to analyze the content of the non-scanned icon while the non-scanned icon is overlapped with the scanned icon. Controlling means 33 is used to control a scanning device to perform a corresponding scanning action according to the content. And a processing means 34 is used to automatically activate a program and/or file, which corresponds to the non-scanned icon, to treat the image acquired by the scanning action after the scanning action is finished.

By comparing with the previous embodiment, the monitoring means 31 corresponds to monitoring block 21, analyzing means 32 corresponds to analyzing block 22, controlling means 33 corresponds to controlling block 33, and the processing means 34 corresponds to processing block 34. In other words, each means is limited by the function of its corresponding block, but is not limited how to form the means. In short, each means could be hardware, such as a microprocessor or integrated circuits, or software, such as program or operating system, a firmware, or a combination of hardware/software/firmware. The embodiment is never limited on how to form each means.

Therefore, the analyzing means 32 could decide a non-scanned icon corresponds to a specific program or a specific file. Analyzing means 32 could decide whether the specific file is distinguishable and what's the corresponding program of the specific file. Controlling means 33 could set up the path for the specific program while the scanning device is activated, such that an image acquired by the scanning action is automatically treated by a specific program after the scanning action is finished. Controlling means 33 could set up the path of the corresponding program of a distinguishable file while the scanning device is activated, such that an image acquired by the scanning action is automatically treated by the corresponding program after the scanning action is finished. Controlling means 33 could send a warning message without activating the scanning device while the non-scanner icon corresponds to a non-distinguishable specific file. Controlling means 33 could send a warning message without activating said scanning device while said specific program is non-available. Controlling means 33 further could perform a corresponding specific action after the scanning action is finished. Herein, possible corresponding specific actions could use an optical character recognition process to treat an image acquired by the scanning action.

Figure 4:
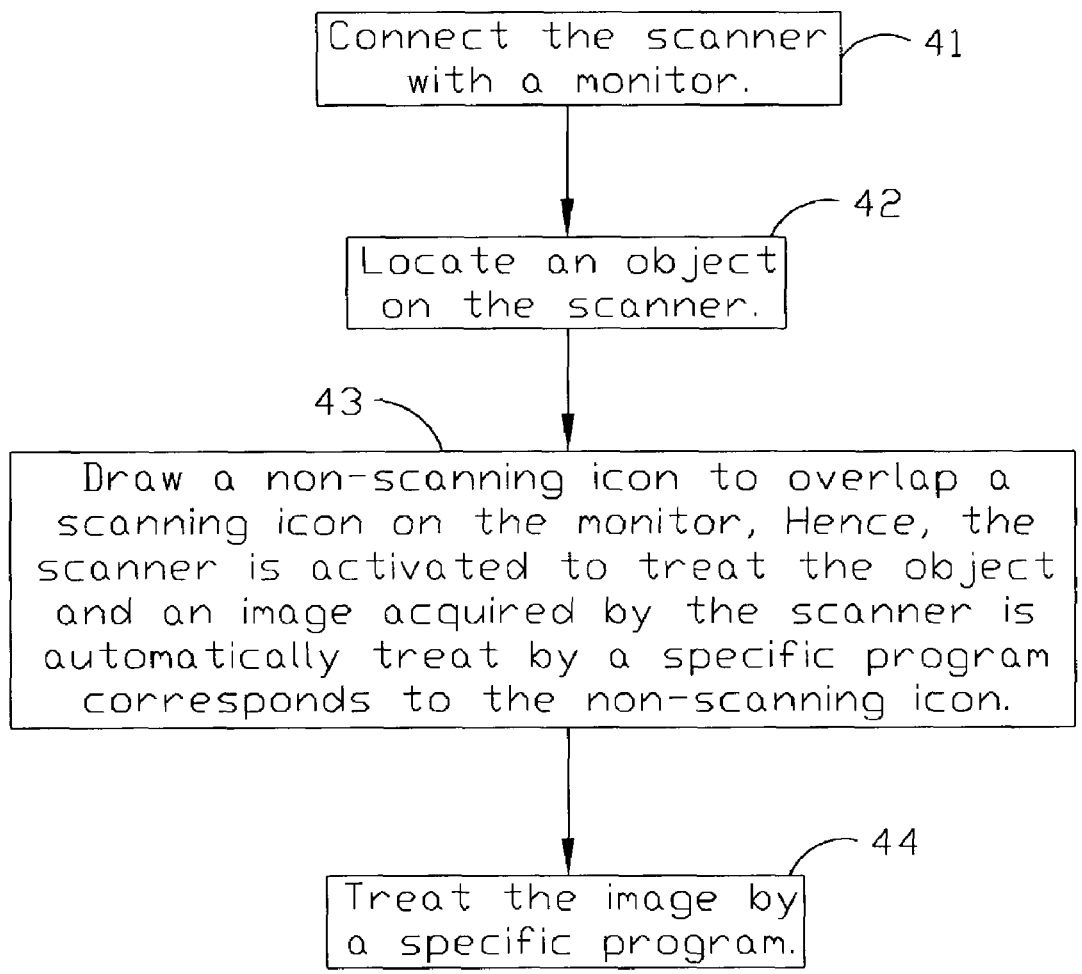
FIG. 4 shows the flow-chart of the other preferred embodiment of the present invention.

The other preferred embodiment of the invention is present from the viewpoint of the user: a method for using a scanner with the functions of drawing and formatting an image. As show in FIG. 4, at least the following steps are provided:

As shown in the first preparation block 41, the scanner connected with a monitor.

As shown in second preparation block 42, an object is located on the scanner.

As shown in icon operation block 43, draw a non-scanned icon to overlap a scanned icon on the monitor, Hence, the scanner is activated to treat the object and an image acquired by the scanner is automatically treated by a specific program corresponds to the non-scanned icon.

However, the embodiment is not limited to only draw the non-scanned icon. In fact, any operation could let the non-scanned icon and the scanned icon be overlapped is available for the embodiment. Herein, the scanned icon corresponds to the scanner and the non-scanned icon corresponds to a program or the file.

As shown in treat block 44, treat the image by a specific program.

Significantly, one main characteristic of the embodiment is that the user only needs to operate the icons. The user need not to set up the details of the program/file to be used before/after the operation of the scanner, the user also need not to consider whether the TAWAN interface is supported by the program/file to be used.

Of course, it is to be understood that the invention need not be limited to these disclosed embodiments. Various modifications and similar changes are still possible within the spirit of this invention. In this way, the scope of this invention should be defined by the appended claims.

What is claimed is:

1. An apparatus for drawing and formatting an image, comprising:
    means for monitoring whether a scanned icon is overlapped with a non-scanned icon on a display device;
    means for analyzing content associated with said non-scanned icon while said non-scanned icon is overlapped with said scanned icon; and
    means for controlling a scanning device to perform a corresponding scanning action according to said content associated with said non-scanned icon.

2. The apparatus according to claim 1, wherein said analyzing means comprises means for determining whether said non-scanned icon corresponds to a specific program.

3. The apparatus according to claim 1, wherein said analyzing means comprises means for determining whether said non-scanned icon corresponds to a specific file.

4. The apparatus according to claim 2, wherein said means for controlling comprises means for controlling said specific program such that an image acquired by said scanning action is automatically treated by said specific program after said scanning action is finished.

5. The apparatus of claim 3, wherein said means for controlling comprises means for controlling said scanning device such that an image acquired by said scanning action is acquired in accordance with said specific file.

6. The apparatus of claim 3, wherein said means for controlling comprises means for sending a warning message without activating said scanning device if said non-scanner icon does not correspond with said specific file.

7. The apparatus of claim 2, wherein said means for controlling comprises means for sending a warning message without activating said scanning device if said specific program is non-available.

8. The apparatus of claim 1, wherein said means for controlling comprises means for further performing a corresponding specific action after said scanning action is finished.

9. The apparatus of claim 8, wherein said corresponding specific action comprises using an optical character recognition process to treat an image acquired by said scanning action.

10. A method for drawing and formatting an image, comprising:
    monitoring whether a scanned icon is overlapped with a non-scanned icon on a display device;
    analyzing content associated with said non-scanned icon in response to said non-scanned icon being overlapped with said scanned icon; and
    controlling a scanning device to perform a corresponding scanning action according to said content associated with said non-scanned icon.

11. The method according to claim 10, wherein said analyzing comprises determining whether said non-scanned icon corresponds to a specific program.

12. The method according to claim 10, wherein said analyzing comprises determining whether said non-scanned icon corresponds with a specific file.

13. The method according to claim 12, wherein said analyzing comprises identifying a corresponding program of said specific file.

14. The method according to claim 11, wherein said controlling comprises controlling said scanning device such that an image acquired by said scanning action is automatically treated by said specific program after said scanning action is finished.

15. The method of claim 13, wherein said controlling comprises controlling said scanning device such that an image acquired by said scanning action is acquired in accordance with said specific file.

16. The method of claim 12, wherein said controlling comprises sending a warning message without activating said scanning device if said non-scanned icon does not correspond with said specific file.

17. The method of claim 11, wherein said controlling comprises sending a warning message without activating said scanning device if said specific program is non-available.

18. The method of claim 10, wherein said controlling comprises further performing a corresponding specific action after said scanning action is finished.

19. The method of claim 18, wherein said corresponding specific action comprises using an optical character recognition process to treat an image acquired by said scanning action.

20. An article comprising a machine-readable storage medium having stored thereon instructions which, when executed, result in:
    monitoring whether a scanned icon is overlapped with a non-scanned icon on a display device;
    analyzing content associated with said non-scanned icon in response to said non-scanned icon being overlapped with said scanned icon; and
    controlling a scanning device to perform a corresponding scanning action according to said content associated with said non-scanned icon.

21. The article of claim 20, wherein said analyzing comprises determining whether said non-scanned icon corresponds to a specific program.

22. The article of claim 20, wherein said analyzing comprises determining whether said non-scanned icon corresponds with a specific file.

23. The article of claim 21, wherein said instructions, when executed, further result in controlling said scanning device such that an image acquired by said scanning action is automatically treated by said specific program after said scanning action is finished.

24. The article of claim 20, wherein said instructions, when executed, further result in performing an additional action after said scanning action is finished.

25. The article of claim 24, wherein said additional action comprises employing an optical character recognition process to treat an image acquired via said scanning action.

26. A method for drawing and formatting an image, comprising:
    analyzing content associated with a non-scanned icon in response to said non-scanned icon being overlapped with a scanned icon on a display device; and controlling a scanning device to perform a corresponding scanning action according to said content associated with said non-scanned icon.

27. The method of claim 26, wherein said analyzing comprises determining whether said non-scanned icon corresponds to a specific program.

28. The method of claim 26, wherein said analyzing comprises determining whether said non-scanned icon corresponds with a specific file.

29. The method of claim 27, further comprising controlling said scanning device such that an image acquired by said scanning action is automatically treated by said specific program after said scanning action is finished.

30. The method of claim 26, further comprising performing an additional action after said scanning action is finished.

31. The method of claim 30, wherein said additional action comprises employing an optical character recognition process to treat an image acquired via said scanning action.

32. An apparatus, comprising:
   a scanner to analyze content associated with a non-scanned icon while said non-scanned icon is overlapped with a scanned icon on a display device; and
   a controller to control the scanning device to perform a corresponding scanning action according to said content associated with said non-scanned icon.

33. The apparatus according to claim 32, wherein said scanner is further adapted to determine whether said non-scanned icon corresponds to a specific program.

34. The apparatus of claim 32, wherein said scanner is further adapted to determine whether said non-scanned icon corresponds to a specific file.

35. The apparatus of claim 33, wherein said controller is further adapted to control said specific program such that an image acquired by said scanning action is automatically treated by said specific program after said scanning action is finished.

36. The apparatus of claim 34, wherein said controller is further adapted to control said scanning device such that an image acquired by said scanning action is acquired in accordance with said specific file.

37. The apparatus of claim 34, wherein said controller is further adapted to control the scanning device to perform an additional action after said scanning action is finished.

38. The apparatus of claim 37, wherein said additional action comprises employing an optical character recognition process to treat an image acquired via said scanning action.

39. An apparatus, comprising:
   a scanner to monitor whether a non-scanned icon is overlapped with a scanned icon on a display device; and
   a controller to control the scanning device to perform a corresponding scanning action according to content associated with said non-scanned icon.

40. The apparatus of claim 39, wherein said controller is further adapted to control said scanning device such that an image acquired by said scanning action is acquired in accordance with a specific file.

41. The apparatus of claim 39, wherein said controller is further adapted to control said scanner such that an image acquired via said scanning action is automatically treated by a specific program after said scanning action is finished.

42. The apparatus of claim 39, wherein said controller is further adapted to control the scanning device to perform an additional action after said scanning action is finished.

43. The apparatus of claim 42, wherein said additional action comprises employing an optical character recognition process to treat an image acquired via said scanning action.

* * * * *